April 14, 1953  H. A. MACKIE ET AL  2,634,446
WINDSHIELD WIPER BLADE CONSTRUCTION AND MOUNTING
Filed May 11, 1946
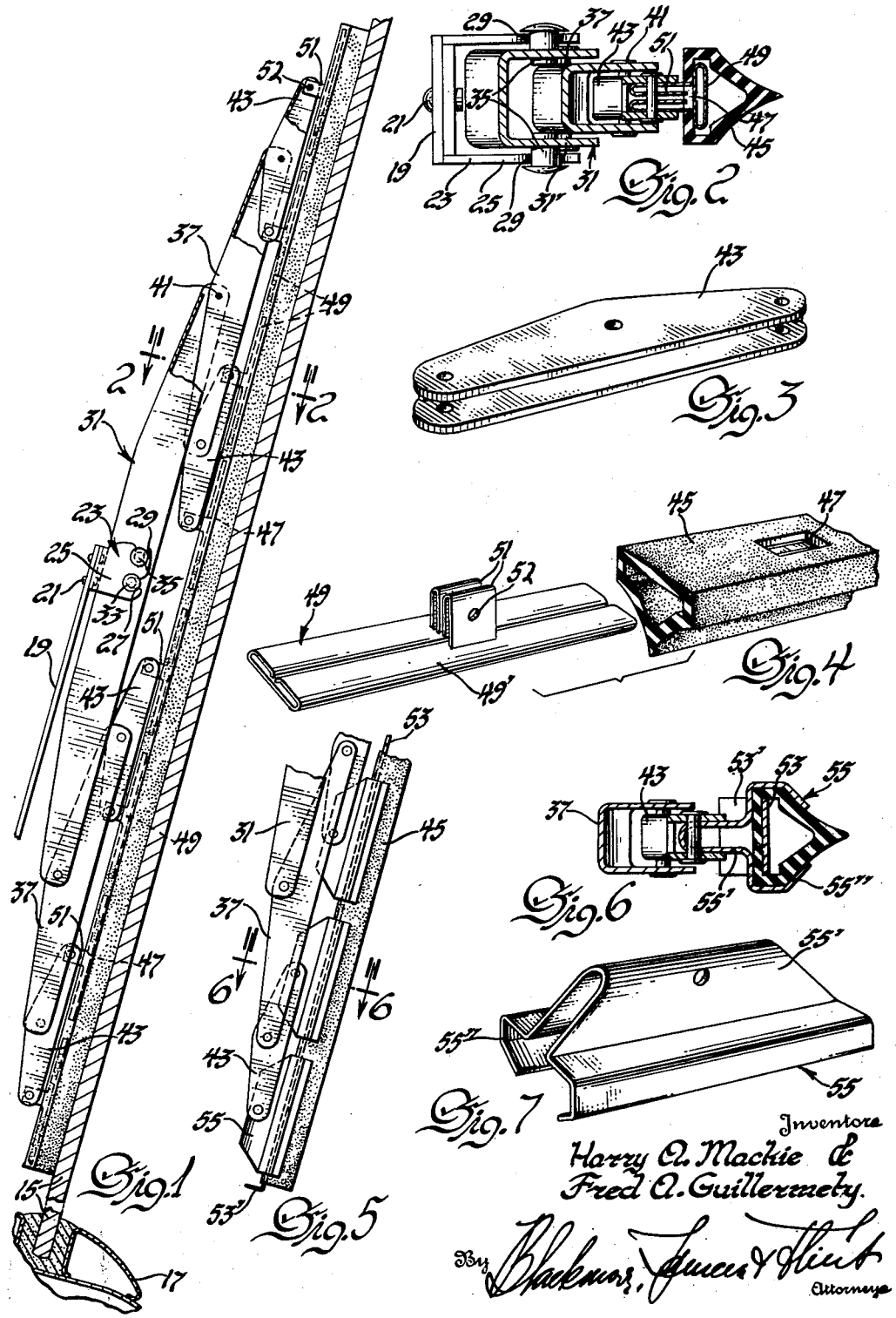

Patented Apr. 14, 1953

2,634,446

UNITED STATES PATENT OFFICE 2,634,446

WINDSHIELD WIPER BLADE CONSTRUCTION AND MOUNTING

Harry A. Mackie and Fred A. Guillermety, Detroit, Mich., assignors to General Motors Corporation, Detroit, Mich., a corporation of Delaware Application May 11, 1946, Serial No. 669,071

2 Claims. (Cl. 15—245)

This invention relates to windshield wipers and, while useful on any windshield, the improved device has been designed particularly for use on windshields having curved rather than plane surfaces.

An object of the invention is to provide means whereby the wiper blade may readily conform to the surface over which it is to travel.

As a further object the invention embodies a flexible blade so formed that, though continuous throughout its length, it may freely bend and conform to the underlying glass surface.

As a further object there is used a whiffletree type of support, the parts of which are freely movable to enable the flexible rubber to conform to the surface of the glass.

Other objects including the use of simple and inexpensive parts by which the principal objects are attained, will be understood from the description which follows.

On the drawings:

Fig. 1 is a view in elevation of one form of the invention.

Fig. 2 is a section on line 2—2 of Fig. 1.

Fig. 3 is a detail in perspective of one of the parts.

Fig. 4 is a detail in perspective showing two parts in disassembled relation.

Fig. 5 is a view in elevation of a second form.

Fig. 6 is a section on line 6—6 of Fig. 5.

Fig. 7 is a perspective of one of the parts used in this second form.

On Fig. 1 is shown in section a glass windshield 15 extending up from a lower support 17. The drawing does not show the usual rockshaft but it does show a part of the arm 19 carried thereby. It will be understood that the glass may have a plane surface but the invention is intended more particularly for a curved surface type of glass wherein the curvature may be of any form desired.

At the extreme end of arm 19 there is secured by fastening means 21 a U-shaped clip 23 having arms 25 each formed with a first notch 27 and a second angularly related notch 29.

A main yoke or channel shaped member 31 has side walls 31' each of which has rivets 33 and 35 the heads of which are spaced from the outer walls as shown in Fig. 2. After assembling rivet 35 in notch 29 the channel 31 may be rotated to the normal position shown in Fig. 1 in which position rivet 33 enters notch 27.

Two secondary yokes in the form of channels marked 37 are located at the ends of channel 31 their mid portions projecting into the recess of channel 31 and pivoted thereto at 41.

Four small yokes in the form of channels marked 43 are provided, one pivoted to each of the ends of channels 37 as shown.

The rubber blade 45 is molded to the form shown by Fig. 4. It is hollow, has a tapered glass engaging edge and its upper flat wall has a plurality of uniformly distributed openings 47. In the form described where there are four small channels 43 provision is made to attach the rubber blade to each end of each small channel in such a way that the blade may bend in a region midway between the points of attachment. To that end eight strips of metal or other material are shaped as shown by Fig. 4 and marked 49. The metal is bent to make a double fold, 49', the latter being in two halves. At the middle of the length of each part 49' a U-bend 51 is formed through which apertures 52 are punched. These eight strips are assembled within the hollow rubber blade with the U bends 51 extending through the openings 47 where they are pivoted to the overlying ends of the small channels 43. It will be seen from Fig. 1 that the strips 49 are dimensioned so that their adjacent ends are spaced to allow bending of the rubber blade therebetween. The whiffletree action will be understood to be intended to allow the blade to conform to curvature of the underlying glass.

In Figures 5, 6 and 7 there is shown a similar but slightly different means for attaching the blade to the equivalent of the small channels 43. A flat resilient plate 53 is extended throughout the length of the hollow blade. It may be held in position by bent ends 53'. In place of the parts 49 and 51 there is provided a clip marked 55 shown in Fig. 7. The metal of the clip is folded to form a U bend 55' which is apertured for pivotal connection to the small channel 43. Outwardly from the U-bend the metal is formed in angular fashion as shown at 55'' so that it may conform to the outer surface of the blade when clamped thereto as best shown by Fig. 6. In this form the whiffletree action and the resilient plate 53 permit the blade to nicely conform to the surface of the windshield.

Each of the forms described makes possible the bending of the blade to conform to the surface of the glass.

We claim:

1. In a wiper for cleaning a curved surface, a hollow resilient blade having a longitudinally extending edge to engage said surface, a plurality of metal strips fitting within the hollow in said blade the fitting being such as to allow movement between said strips and said blade as said blade is stretched in a longitudinal direction, said strips being arranged in longitudinal alignment with their ends spaced from one another to permit flexing of said blade between the spaced ends of said strips in a plane normal to said surface to conform to the curvature thereof, and operating means connected to each of said strips intermediate the ends of said strips.

2. In a wiper for cleaning a curved surface, a wiper arm, a hollow resilient blade having a longitudinally extending edge to engage said surface, a plurality of metal strips fitting within the hollow in said blade which are arranged in longitudinal alignment with their ends spaced from one another to permit flexing of said blade between the spaced ends of said strips in a plane normal to said surface and permit slipping of said strips in said blade to allow longitudinal stretching of said blade, an attaching portion on each of said strips intermediate the ends thereof which extends outwardly through an opening in said blade with said portions on the several strips substantially equally spaced longitudinally of said blade, and a multiple yoke system between said wiper arm and said attaching portions to distribute the pressure from said arm to said blade to cause said blade to conform to the curvature of said surface.

HARRY A. MACKIE.
FRED A. GUILLERMETY.

References Cited in the file of this patent

UNITED STATES PATENTS

| Number | Name | Date |
|---|---|---|
| 1,755,155 | Storrie | Apr. 15, 1930 |
| 2,303,694 | Horton | Dec. 1, 1942 |

FOREIGN PATENTS

| Number | Country | Date |
|---|---|---|
| 345,867 | Canada | Nov. 6, 1934 |
| 427,383 | Great Britain | Apr. 23, 1935 |
| 820,156 | France | Nov. 5, 1937 |